United States Patent
Jobity et al.

(10) Patent No.: US 11,367,421 B2
(45) Date of Patent: Jun. 21, 2022

(54) AUTONOMOUS TUNER FOR STRINGED INSTRUMENTS

(71) Applicant: 2UNIFY INC., Hamilton (CA)

(72) Inventors: Michael Jobity, Stoney Creek (CA); Ryan Ng Cheong Ton, Mississauga (CA); Mitchell Wong, North York (CA); Michael Salamaszek, Mississauga (CA); Curtis Graham, Port Perry (CA)

(73) Assignee: 2UNIFY INC., Hamilton (CA)

( * ) Notice: Subject to any disclaimer, the term of this patent is extended or adjusted under 35 U.S.C. 154(b) by 0 days.

(21) Appl. No.: 17/150,726

(22) Filed: Jan. 15, 2021

(65) Prior Publication Data

US 2022/0059060 A1 Feb. 24, 2022

Related U.S. Application Data

(60) Provisional application No. 63/068,717, filed on Aug. 21, 2020.

(51) Int. Cl.
*G10D 3/14* (2020.01)
*G10D 1/00* (2020.01)
(Continued)

(52) U.S. Cl.
CPC .............. *G10D 3/14* (2013.01); *B25J 9/1612* (2013.01); *B25J 9/1697* (2013.01); *B25J 11/004* (2013.01); *G06T 7/70* (2017.01); *G06V 20/10* (2022.01); *G10C 3/10* (2013.01); *G10C 9/00* (2013.01); *G10D 1/00* (2013.01); *G10G 5/00* (2013.01);
(Continued)

(58) Field of Classification Search
CPC . G06T 7/70; G06T 2207/20084; G06V 20/10; B25J 9/1612; B25J 9/1697; G10C 3/10; G10C 9/00; G10D 1/00
See application file for complete search history.

(56) References Cited

U.S. PATENT DOCUMENTS

| | | | |
|---|---|---|---|
| 4,426,907 A | 1/1984 | Scholz | |
| 4,584,923 A * | 4/1986 | Minnick | G10G 7/02 84/723 |

(Continued)

FOREIGN PATENT DOCUMENTS

CN 112017617 A * 12/2020

*Primary Examiner* — Robert W Horn
(74) *Attorney, Agent, or Firm* — Hill & Schumacher

(57) ABSTRACT

Systems and methods are provided performing autonomous tuning of a stringed instrument. Images of the stringed instrument are acquired by at least two cameras and processed to identify the location of a peg. A robotic peg actuator is then engaged to actuate rotation of a peg in order to rotate the peg to a tuned angular orientation, guided by feedback generated by processing acoustic signals recorded by an acoustic transducer while a string associated with the peg is agitated. In some example implementations, the cameras and peg actuator are rigidly mounted to a frame that is configured to support the stringed instrument during peg imaging and actuation. A robotic string actuator may be provided to facilitate vibration of the string during the tuning process. Multiple robotic peg actuators may be included for per-peg rotational actuation and/or a given peg actuator may be robotically translatable to actuate more than one peg.

20 Claims, 9 Drawing Sheets

(51) Int. Cl.
*G10G 5/00* (2006.01)
*G06T 7/70* (2017.01)
*G10C 9/00* (2019.01)
*G10L 25/51* (2013.01)
*B25J 9/16* (2006.01)
*B25J 11/00* (2006.01)
*G10C 3/10* (2019.01)
*G06V 20/10* (2022.01)

(52) U.S. Cl.
CPC .... *G10L 25/51* (2013.01); *G06T 2207/20084* (2013.01)

(56) References Cited

U.S. PATENT DOCUMENTS

| | | | | |
|---|---|---|---|---|
| 4,909,126 A | * | 3/1990 | Skinn | G10G 7/02 984/260 |
| 4,958,550 A | * | 9/1990 | Kugimoto | G10C 9/00 984/72 |
| 5,009,142 A | * | 4/1991 | Kurtz | G10D 3/14 84/DIG. 12 |
| 5,038,657 A | * | 8/1991 | Busley | G10G 7/02 84/DIG. 18 |
| 5,095,797 A | * | 3/1992 | Zacaroli | G10G 7/02 84/DIG. 18 |
| 5,323,680 A | * | 6/1994 | Miller | G10D 3/14 84/DIG. 18 |
| 5,343,793 A | * | 9/1994 | Pattie | G10G 7/02 84/DIG. 18 |
| 5,390,579 A | * | 2/1995 | Burgon | G10D 3/14 84/DIG. 18 |
| 5,824,929 A | * | 10/1998 | Freeland | G10D 3/14 84/DIG. 18 |
| 5,886,270 A | * | 3/1999 | Wynn | G10D 3/14 84/313 |
| 6,184,452 B1 | * | 2/2001 | Long | G10D 3/14 84/723 |
| 6,278,047 B1 | * | 8/2001 | Cumberland | G10G 7/02 84/734 |
| 7,179,985 B2 | | 2/2007 | Pickens | |
| 7,659,467 B2 | * | 2/2010 | Adams | G10D 3/04 84/7 |
| 7,692,085 B2 | * | 4/2010 | Adams | G10D 3/147 84/312 R |
| 7,858,865 B2 | * | 12/2010 | D'Arco | G10D 3/147 84/454 |
| 7,935,876 B1 | * | 5/2011 | West | G10D 3/153 84/200 |
| 8,872,010 B2 | * | 10/2014 | Villaran-Valdivia | G10G 7/02 84/455 |
| 8,927,838 B2 | * | 1/2015 | Jalgha | G01G 7/02 84/304 |
| 9,330,643 B2 | | 5/2016 | Field | |
| 9,536,505 B1 | * | 1/2017 | Tsfasman | G10H 3/125 |
| 10,586,518 B2 | * | 3/2020 | Jalgha | G10H 3/22 |
| 2006/0037459 A1 | * | 2/2006 | Skinn | G10G 7/02 84/312 R |
| 2007/0214935 A1 | | 9/2007 | Lyles et al. | |
| 2008/0006140 A1 | * | 1/2008 | Adams | G10G 7/02 84/455 |
| 2014/0260620 A1 | | 9/2014 | Raniere | |

* cited by examiner

AUTONOMOUS TUNER FOR STRINGED INSTRUMENTS

CROSS-REFERENCE TO RELATED APPLICATION

This application claims priority to U.S. Provisional Patent Application No. 63/068,717, titled "AUTONOMOUS TUNER FOR STRINGED INSTRUMENTS" and filed on Aug. 21, 2020, the entire contents of which is incorporated herein by reference.

BACKGROUND

The present disclosure relates to devices for tuning stringed instruments.

Stringed instruments need to be tuned quickly and accurately before they are played. If they are not tuned correctly, musicians and music institutions could lose their business. Not only is it difficult to tune stringed instruments, but the consequences of playing an untuned instrument are severe. Tuning in loud environments is very difficult, tuning in front of a crowd is unpleasant, and playing an untuned instrument leads to stress and anxiety. In addition to performing, musicians are expected to frequently tune their instruments when new strings are inserted, and beginners often struggle to detect the correct frequencies for each note.

In addition to musicians, music institutions also struggle to have their instruments tuned. Recording studios, music stores, music schools, and concert venues all possess a high volume of instruments that need to be tuned quickly with high accuracy. In the case of music stores, selling an untuned instrument could lead to a decrease in annual revenue. For introductory courses at music schools, the teachers are expected to tune over 30 instruments before each class. This is a tedious task that reduces the time for musical theory and forces students to pay for less valued time. Furthermore, recording studios require precise tuning for mastering or mixing live music, and concert venues require different tuning standards for multiple bands.

Altogether, it is evident that tuning is a tedious and undesirable process for musicians and music institutions of stringed instruments. There is a clear demand for an easy and customizable solution that can adhere to a variety of use cases.

SUMMARY

Systems and methods are provided performing autonomous tuning of a stringed instrument. Images of the stringed instrument are acquired by at least two cameras and processed to identify the location of a peg. A robotic peg actuator is then engaged to actuate rotation of a peg in order to rotate the peg to a tuned angular orientation, guided by feedback generated by processing acoustic signals recorded by an acoustic transducer while a string associated with the peg is agitated. In some example implementations, the cameras and the peg actuator are rigidly mounted to a frame that is configured to support the stringed instrument during peg imaging and actuation. A robotic string actuator may be provided to facilitate vibration of the string during the tuning process. Multiple robotic peg actuators may be included for per-peg rotational actuation and/or a given peg actuator may be robotically translatable to actuate more than one peg.

Accordingly, in one aspect, there is provided a system for autonomous tuning of a stringed instrument, the system comprising:

a support frame configured to mechanically engage with the stringed instrument such that the stringed instrument is supported relative to the support frame;

an imaging subsystem supported relative to the support frame;

a robotic peg manipulator movable relative to the support frame;

an acoustic transducer; and control and processing circuitry operably coupled to the imaging subsystem, the robotic peg manipulator and the acoustic transducer, the control and processing circuitry comprising at least one processor and associated memory, the memory comprising instructions executable by the at least one processor for performing operations comprising:

receiving, from the imaging subsystem, image data characterizing a field of view including a peg of the stringed instrument;

processing the image data to locate the peg;

controlling the robotic peg manipulator to position the robotic peg manipulator relative to the peg such that the robotic peg manipulator is capable of rotationally actuating the peg;

recording acoustic signals responsively generated by agitation of a string associated with the peg; and processing the acoustic signals and employing tuning criteria to control the robotic peg manipulator to rotationally actuate the peg for tuning the stringed instrument.

In some implementations of the system, the system further comprises a string agitation mechanism capable of agitating the string of the stringed instrument when the stringed instrument is supported by the support frame; the control and processing circuitry being operatively coupled to the string agitation mechanism for actuating the string agitation mechanism for generating the acoustic signals.

In some implementations of the system, the robotic peg manipulator is controllable by the control and processing circuitry to translate and engage with at least one additional peg identified by the control and processing circuitry.

In some implementations of the system, the robotic peg manipulator is controllable by the control and processing circuitry for translating the robotic peg manipulator to engage with the peg.

In some implementations of the system, the robotic peg manipulator comprises at least one joint and an associated motor for actuating the joint.

In some implementations of the system, the robotic peg manipulator comprises at least three joints, each joint being controllable by actuation of a respective motor.

In some implementations of the system, a distal region of the robotic peg manipulator comprises an end effector configured to contact the peg and apply a torque to the peg when the end effector is rotated.

In some implementations of the system, the control and processing circuitry is configured to control the robotic peg manipulator to rotate the end effector of the robotic peg manipulator while positioning the robotic peg manipulator to engage with the peg, thereby enabling catching of the peg by structural features of the end effector during approach of the robotic peg manipulator relative to the peg.

In some implementations of the system, the robotic peg manipulator is a first robotic peg manipulator, the system further comprising at least one additional robotic peg manipulator controllable by the control and processing circuitry to translate and engage with a respective additional peg identified by the control and processing circuitry.

In some implementations of the system, the control and processing circuitry is configured to perform polyphonic tuning by simultaneously controlling the first robotic peg manipulator and the at least one additional robotic peg manipulator to tune the stringed instrument.

In some implementations of the system, the robotic peg manipulator is a first robotic peg manipulator positioned to reside on a first side of the stringed instrument when the stringed instrument is supported relative to the support frame for robotically actuating one or more first pegs on located on the first side of the stringed instrument, and wherein the system comprises a second robotic peg manipulator operably coupled to the control and processing circuitry and positioned to reside on a second side of the stringed instrument when the stringed instrument is supported relative to the support frame for robotically actuating one or more second pegs on located on the second side of the stringed instrument.

In some implementations of the system, the support frame is a stand configured to support the stringed instrument. A height of the stand may be adjustable to facilitate autonomous of different types and/or different sizes of stringed instruments.

In some implementations of the system, one or more of the imaging subsystem and the robotic peg manipulator is positionable, relative to the support frame, to facilitate autonomous of different types and/or different sizes of stringed instruments.

In some implementations of the system, at least a portion of the control and processing circuitry is housed within the support frame.

In some implementations of the system, the support frame is configured to support at least one stringed instrument selected from the group consisting of a guitar, cello, violin, ukulele, banjo, viola, mandolin, and harp.

In some implementations of the system, the stringed instrument is a piano, the support frame being configured to mechanically engage with the piano to support the imaging subsystem and the robotic peg manipulator relative to the piano for autonomous tuning of at least one tuning pin of the piano.

In some implementations of the system, the stringed instrument is a first stringed instrument, and wherein the support frame is configured to support a second stringed instrument while also supporting the first stringed instrument, wherein the field of view of the imaging subsystem includes a peg of the second stringed instrument, and wherein the robotic peg manipulator is controllable to robotically engage with and rotationally actuate at least one peg from the first stringed instrument and at least one peg from the second stringed instrument.

In some implementations of the system, the control and processing circuitry is configured to locate the peg by employing one of an R-CNN algorithm, a histogram of oriented gradients (HOG), a region-based convolutional neural network, a region-based fully convolutional network, a single-shot detector, and spatial pyramid pooling.

In another aspect, there is provided a method for autonomous tuning of a stringed instrument, the method comprising:

mechanically engaging the stringed instrument with a support frame such that the stringed instrument is supported relative to the support frame;

employing an imaging subsystem supported relative to the support frame to obtain image data characterizing a field of view including a peg of the stringed instrument;

processing the image data to locate the peg;

controlling a robotic peg manipulator to move the robotic peg manipulator relative to the support frame and mechanically engage with the peg such that the robotic peg manipulator is capable of rotationally actuating the peg;

recording acoustic signals responsively generated by agitation of a string associated with the peg; and processing the acoustic signals and employing tuning criteria to control the robotic peg manipulator to rotationally actuate the peg for tuning the stringed instrument.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Figure 1:
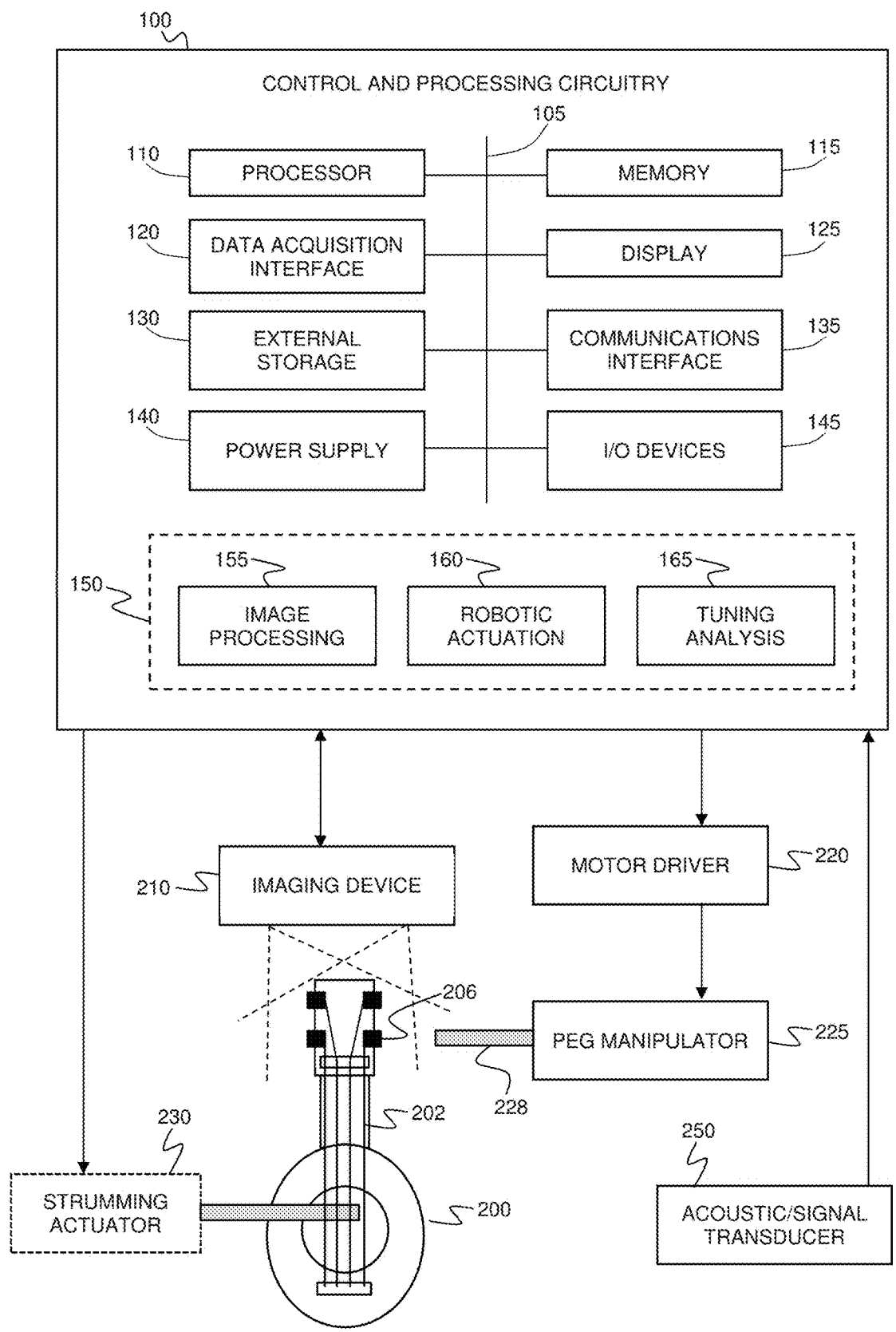
FIG. 1 shows an example system for performing autonomous tuning of a stringed instrument.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

As used herein, the phrase "stringed instrument" refers to musical instruments that produce sound based on vibration of a string.

As used herein, the phrase "peg" refers to a rotatable member (e.g. a pin) that is cable of adjustment of the tuning of a musical instrument.

As mentioned above, stringed instruments need to be tuned quickly and accurately before they are played. If they are not tuned correctly, musicians and music institutions could lose their business. Not only is it difficult to tune stringed instruments, but the consequences of playing an untuned instrument are severe. Tuning in loud environments is very difficult, tuning in front of a crowd is unpleasant, and playing an untuned instrument leads to stress and anxiety. In addition to performing, musicians are expected to frequently tune their instruments when new strings are inserted, and beginners often struggle to detect the correct frequencies for each note.

In addition to musicians, music institutions also struggle to have their instruments tuned. Recording studios, music stores, music schools, and concert venues all possess a high volume of instruments that need to be tuned quickly with high accuracy. In the case of music stores, selling an untuned instrument could lead to a decrease in annual revenue. For introductory courses at music schools, the teachers are expected to tune over 30 instruments before each class. This is a tedious task that reduces the time for musical theory and forces students to pay for less valued time. Furthermore, recording studios require precise tuning for mastering or mixing live music, and concert venues require different tuning standards for multiple bands.

Altogether, it is evident that tuning is a tedious and undesirable process for musicians and music institutions of stringed instruments. There is a clear demand for an easy and customizable solution that can adhere to a variety of use cases.

Various example embodiments of the present disclosure provide autonomous tuning systems and methods that employ a combination of computer vision and robotic actuation to achieve autonomous tuning of a stringed instrument. Referring now to FIG. 1, an example system is shown for performing autonomous tuning of a stringed instrument 200 having a peg 206 and an associated string 202. The example system includes control and processing circuitry 100 (described in further detail below), an imaging device 210, a robotic peg manipulator 225, and an acoustic transducer (e.g. microphone) 250. The imaging device 210 is employed to locate the peg and the robotic peg manipulator 225 is employed to engage with the peg 206. The peg 206 is rotated by the robotic peg manipulator 225 to tune the string 202 according to a tuning algorithm that employs acoustic signals recorded during agitation of the string (e.g. via the strumming actuator 230).

The robotic peg manipulator 225 has a distal region 228 that is configured to contact the peg 206 such that as the distal region 228 of the robotic peg manipulator 225 is rotated, the peg 206 is responsively rotated. The distal region 228 may be rotated relative to a proximal region of the robotic peg manipulator 225. In some example implementations, the distal region 228 includes an end effector that is rotatable to rotate the peg 206.

Although not shown in FIG. 1, the system may include a support frame (e.g. a support structure including one or more support members) for supporting the imaging device 210 in a fixed spatial relationship relative to the stringed instrument 200. The support frame is also configured to support the robotic peg manipulator 225 such that the peg manipulator is movable, under robotic actuation, relative to the support frame. The robotic peg manipulator 225 is actuated and moved relative to the support frame such that a distal region 228 of the robotic peg manipulator 225 is positioned such that when the distal region 228 of the robotic peg manipulator 225 is rotated, the peg 206 is responsively rotated via mechanical engagement, thereby facilitating tuning of the string 204.

In some example embodiments, the support frame may be configured to support the stringed instrument 200, as illustrated in various example implementations described herein. The support frame may be attachable to the stringed instrument 200, for example, via a clamp or other removable attachment device, such that the imaging device 210 and the robotic peg manipulator 225 are supported relative to the stringed instrument 200. In some example implementations, the support frame may be an instrument case or the support frame may be attachable to an instrument case. In some example implementations, the support frame may be attachable to a wall or other structure (e.g. a door frame). In some example implementations, the support frame may be capable of supporting two or more stringed instruments simultaneously, with the imaging device (e.g. one or more cameras) having a field of view sufficient for imaging pegs of each of the supported stringed instruments, and where at least one robotic peg actuator is positionable to rotationally actuate at least a first peg from a first supported stringed instrument and a second peg from a second supported stringed instrument.

Figure 2:
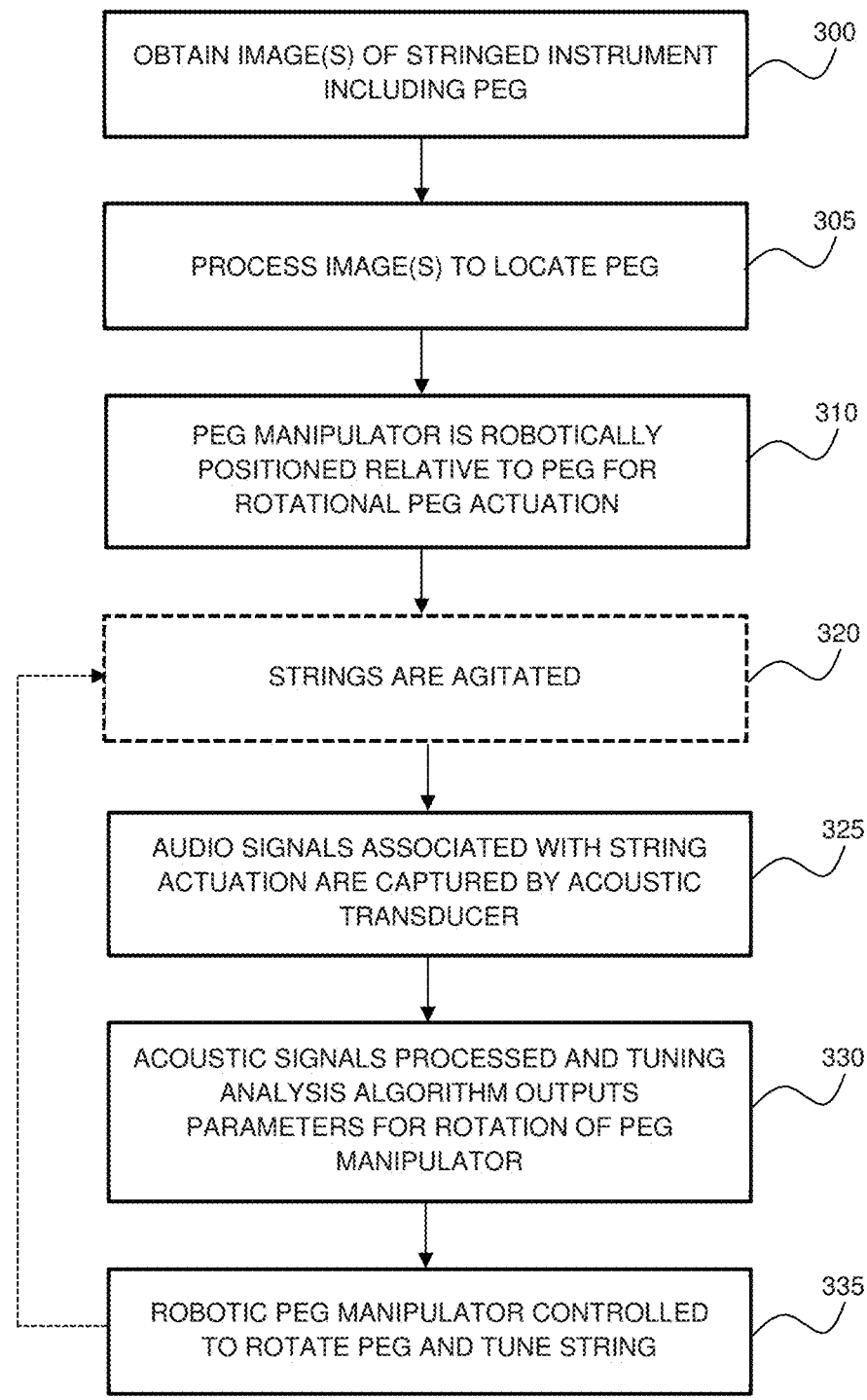
FIG. 2 is a flow chart illustrating an example method for performing autonomous tuning of a stringed instrument.

FIG. 2 illustrates an example method of performing autonomous tuning of a stringed instrument. As shown at step 300, at least one image is obtained of at least a portion of a stringed instrument, where the one or more images include a peg of the stringed instrument that is to be actuated for tuning a string of the stringed instrument. The images are processed in step 305 to locate the peg. Referring to FIG. 1, a computer vision and image processing algorithm for peg localization may be implemented as a module 155 of the control and processing circuitry 100. In one example implementation, one or more cameras 210 are employed take an image or a set of images (e.g. a video) that includes one or more pegs (e.g. the image(s) may show the back of the headstock of the stringed instrument). The images are processed according to the peg localization algorithm with the pegs of the stringed instrument as the objects of interest 206. The images including the pegs 206 are processed via a localization algorithm within image processing module 155. Module 155 may output a series of coordinates that are then converted to the coordinate system of the motors of the robotic arms.

In step 310, the robotic peg manipulator is robotically actuated (e.g. under control of robotic actuation module 160 in FIG. 1) to position the distal region of the robotic peg manipulator relative to the peg such that the peg is contacted and rotated by the distal region of the robotic peg manipulator when the distal region of the robotic peg manipulator is rotated. In some example implementations, the image processing step 305 is employed to provide both a location of the peg and an initial angular orientation of the peg. If the initial peg orientation is known, the robotic peg manipulator may be controlled in step 310 such that the distal end thereof (e.g. a robotic end effector) is rotationally aligned with the initial angular orientation of the peg, and such that when the distal region of the robotic peg actuator is moved to engage with the peg, the peg is received within or adjacent to one or more features of the distal region of the robotic peg actuator. For example, if the distal region of the robotic peg actuator includes a slot for receiving the peg, the robotic peg manipulator may be actuated to align the slot with the initial angular orientation of the peg prior to or during movement of the robotic peg manipulator in step 310. In another example implementation, the robotic peg manipulator may be rotated as it is moved to approach the peg in step 310, thereby allowing the distal region of the robotic peg manipulator to rotate into the correct position and catch the peg during engagement. As noted below, the robotic peg manipulator may optionally secure (e.g. attach, clamp) the peg in step 310.

As shown in step 320, the string associated with the peg is agitated to facilitate tuning. The string agitation may be performed, for example, by having an operator or user pluck the string. Alternatively, as shown in FIG. 1, a strumming actuator 230, supported by the support frame, may be controlled by the control and processing circuitry 100 to automate the agitation of the string. In one example implementation, the stumming actuator may include a pick or other actuating member (e.g. a hammer) that is movable, under control of a motor (or other actuating device, such as a piezoelectric actuator), relative to the string.

During or after agitation of the strings, a microphone (acoustic transducer) is employed to record acoustic signals, as shown at step 325. The acoustic signals are then processed in step 330, according to a tuning algorithm, to determine one or more parameters for rotational actuation of the robotic peg manipulator to rotate the peg and tune the string. The robotic peg actuator is then controlled in step 335 according to the parameters to tune the string. Referring to FIG. 1, the tuning analysis module 165 may acoustically filter the sound energy and determine the peg rotation required by the peg manipulators to achieve the correct pitch of each string 202 according to tuning criteria through a feedback system with the signal transducer 250. For example, the tuning algorithm may compare a detected acoustic frequency of the string with a desired frequency and employ a look-up table or other relationship (e.g. between frequency and peg rotation angle) to compute control parameters for rotating the peg to a new angular orientation for tuning the string. In another example implementation, the tuning algorithm may determine a rotational direction in which to rotate the peg to tune the string to the desired frequency in step 330, and the robotic peg manipulator is actuated to rotate in the prescribed rotational orientation in step 335, with steps 320-335 (or 325-335 if the string continues to vibrate) being repeated until a sufficient (e.g. prescribed) tuning is achieved. For example, tuning may be achieved through a real-time feedback system whereby a duty cycle of a servo controlling rotation of the peg is varied according to an acoustic frequency of the string agitation determined by processing acoustic signals detected by the acoustic transducer.

In some example embodiments, the robotic peg manipulator may include an end effector that is robotically controlled to grip (e.g. clamp, attach to) the peg. For example, the end effector may include two or more gripping members that can be actuated to grip the peg. Such an example implementation may be useful when the peg is a pin having a cylindrical distal profile. In some example implementations, the end effector may be connectable to the peg in latching configuration.

In other example embodiments, the end effector may be configured to rotate the peg without being secured to the peg. For example, in one example implementation, the end effector may include a slot that is capable of receiving (recessing) the peg when the distal region of the peg manipulator is moved to engage with the peg. In another one example implementation, the end effector may include two or more protuberances (e.g. distal fingers or members) that are positionable on opposing sides of the peg when the distal region of the peg manipulator is moved to engage with the peg, such that the peg is contacted by at least one respective protrusion when the peg is rotated in a given direction. In another example implementation, the distal region of the robotic peg manipulator may include a compressible material (e.g. an elastic or viscoelastic material) that is capable of applying a torque to the peg when engaged with the peg from a direction parallel to a longitudinal axis of the peg.

In some example embodiments, the robotic peg manipulator includes at least two motors, with at least one motor being configured to rotate at least the distal region, and at least one motor being provided to move at least a portion of the robotic peg manipulator in at least one direction or about at least one axis. In some example implementations, the robotic peg manipulator may include, in addition a motor for rotating at least the distal region, one or more translation motors, each translation motor having an associated translation stage. In other example implementations, the robotic peg manipulator may include a motor for rotating a first member relative to another member about a joint. In some example implementations, the robotic peg manipulator may include at least three joints, each joint having an associated motor. In some example implementations, the robotic peg manipulator may include at least one joint having an associated motor and one translation stage having an associate motor. In one example implementation, the robotic peg manipulator includes two motors, a first motor being configured to rotate at least the distal region, and the second motor being configured to translate at least the distal region in a direction parallel to a longitudinal axis of the peg.

The robotic peg manipulator may be configured to engage with a peg according to many different implementations. Non-limiting example implementations include, but are not limited to, dynamic moving peg manipulator engagement through various degrees of freedom. In some example implementations, a rail system (e.g. single rail system) of stationary peg manipulators may be employed. Such an implementation would involve a rail of motor-controlled peg manipulators that would be brought to the pegs via movement of the rail, as well as a degree of freedom to rotate the peg of the stringed instrument.

Figure 3:
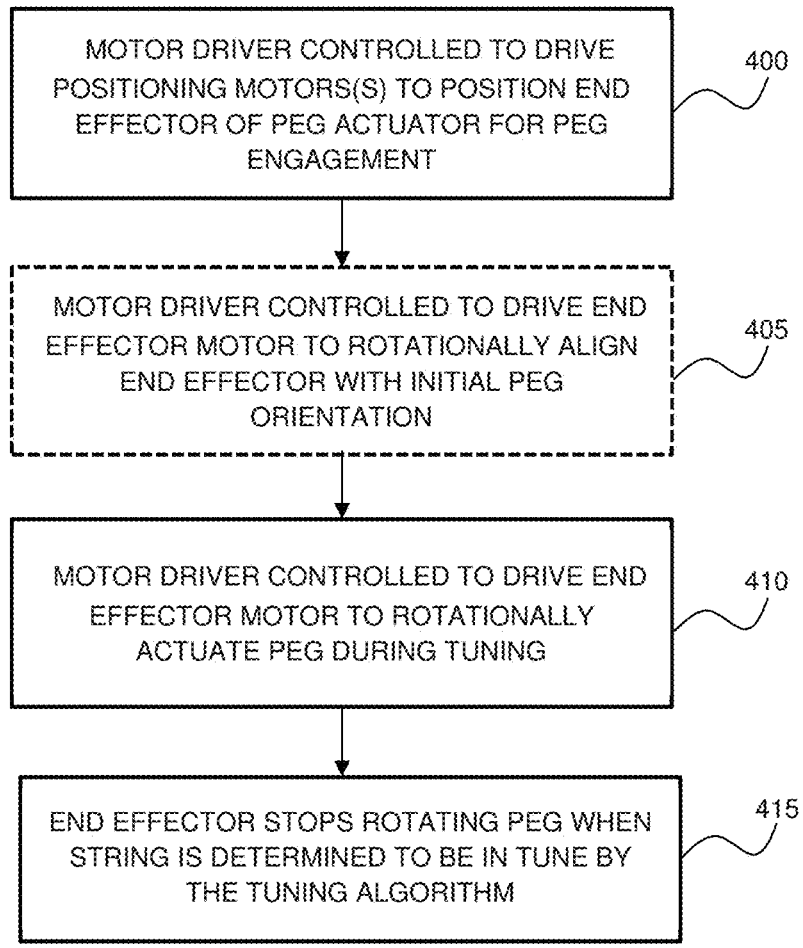
FIG. 3 is a flow chart illustrating an example method for actuating the motor-controlled peg manipulators and having them engage with the pegs of the stringed instrument.

FIG. 3 illustrates an example method of controlling the robotic peg actuation subsystem for peg engagement and peg rotational actuation during tuning of the stringed instrument. A motor driver is controlled to provide a drive signal to a motor of a motor-driven robotic peg manipulator, as shown at step 400. The robotic peg manipulator is translated and/or rotated by the motor such that a distal region of the robotic peg manipulator is positioned for rotationally actuating the peg, with rotational aligned being shown in optional step 405. The alignment of the robotic peg actuator with a respective peg for rotational actuation of the peg is possible through the generation of peg coordinates, initially determined in a frame of reference (coordinate system) of the imaging device, into a coordinate system associated with the robotic peg manipulator, as explained in further detail below. The motor driver associated with rotation of the distal region of the robotic peg manipulator is controlled in step 410 to rotationally actuate the peg during tuning, and rotation actuation of the peg is stopped when a desired level of tuning is achieved, as shown in step 415.

Although some of the preceding example embodiments were described with reference to the tuning of one peg, it will be understood that a plurality of pegs may be tuned to tune the stringed instrument. In some example implementations, the system may include one or more robotic peg actuation devices that are employed to tune a plurality of pegs. For example, a single robotic peg manipulator may be robotically positioned by the system (according to a plurality of peg locations determined by processing one or more images) to serially engage with and tune each peg. In another example implementation, one robotic peg manipulator may be positioned and controlled to tune a first set of pegs on a first side of a stringed instrument, and another robotic peg manipulator may be positioned and controlled to tune a second set of pegs on a second side of a stringed instrument. In yet another example implementation, one robotic peg manipulator may be provided for each peg. In some example implementations, one or more robotic peg manipulators may be configured to reside in a folded state when not employed for robotic peg actuation.

In some example implementations, two or more pegs (and associated strings) may be tuned at different times (e.g. serially in time). In other example implementations, two or more pegs (and associated strings) may be tuned in a polyphonic manner, that is, overlapping in time.

Although many of the example embodiments described herein illustrate the use of an autonomous tuning system for the tuning of a guitar, it will be understood that a wide variety of musical instruments may be tuned according to the embodiments disclosed herein and variations or adaptations thereof. For instance, pianos can be tuned by acquiring the frequency from an acoustic transducer and turning the tuning pegs. Since there are a high quantity of tuning pegs, a rail system could be used to move the peg manipulator to the correct location each time, and actuation could be achieved by direct actuation of a given string of actuation of a key of the piano. Examples of stringed instruments that may be tuned according to an autonomous tuner of the present disclosure include, but are not limited to, guitars, cellos, violins, ukuleles, banjos, pianos, violas, mandolins, and harps.

In some example implementations, an autonomous tuning system may be configured to tune one type of musical instrument or a number of different types of musical instruments. For example, the system may be adjustable, such as by including an adjustable tuning stand that can be shifted to different heights and is capable of securing a range of different musical instruments of varying sizes. The shifting mechanism may be user adjustable to facilitate the securing of different instruments, such as different types of guitars and/or, for example, different types of instruments, such as a guitar and a violin. The imaging device may be positioned or positionable (e.g. user positionable) to facilitate the acquisition of images for one or more types of instruments and/or size ranges of a given type of instrument. The robotic peg manipulator(s) may be capable of engagement with pegs of one or more types of instruments and/or size ranges of a given type of instrument. In some example implementations, the robotic peg manipulator may be user-adjustable relative to the support frame to facilitate engagement with one or more pegs of a given instrument type or instrument size.

In some example embodiments, the support frame may include reference markings or reference features to facilitate adjustment (e.g. adjustment of the shifting mechanism), the imaging device, the robotic peg manipulator, and optionally one or more other components such as the strumming actuator or the acoustic transducer, where the reference markings or reference features are indicative of suitable positions for accommodating different instrument types and/or instrument sizes. Examples of reference features include securing or alignment features such as holes or protuberances that facilitate spatial alignment.

In some example implementations, the autonomous tuning system may be pre-programmed with spatial reference data pertaining to one or more instrument types, sizes, models, or other configurations. In one example implementation, the spatial data may relate to a spatial region within which the pegs are expected to lie when a given instrument is secured or mounted to the support frame in a given position and/or orientation. The spatial reference data may be beneficial in improving the efficiency and/or accuracy of peg localization. The spatial reference data may also facilitate improved robotic alignment of the robotic peg manipulator with the pegs during peg engagement, and/or may facilitate collision avoidance during peg engagement. In some example implementations, the autonomous tuning system may provide a user interface (e.g. on a display device that is integrated with the support frame or remote from the support frame, such as presented through an app of a mobile computing device in wireless communication with the control and processing circuitry) through which a given type, size, model or other instrument configuration is selectable by a user.

In some example implementations, the system may be configured to accommodate different instrument types by assigning a given peg manipulator to turn two tuning pegs if their separation distance is less than the separation distance of two consecutive peg manipulators. In some example embodiments the width of the peg manipulator may be selected such that the thickness of the pegs of any stringed instrument of a given type or set of types of musical instruments.

Figure 4:
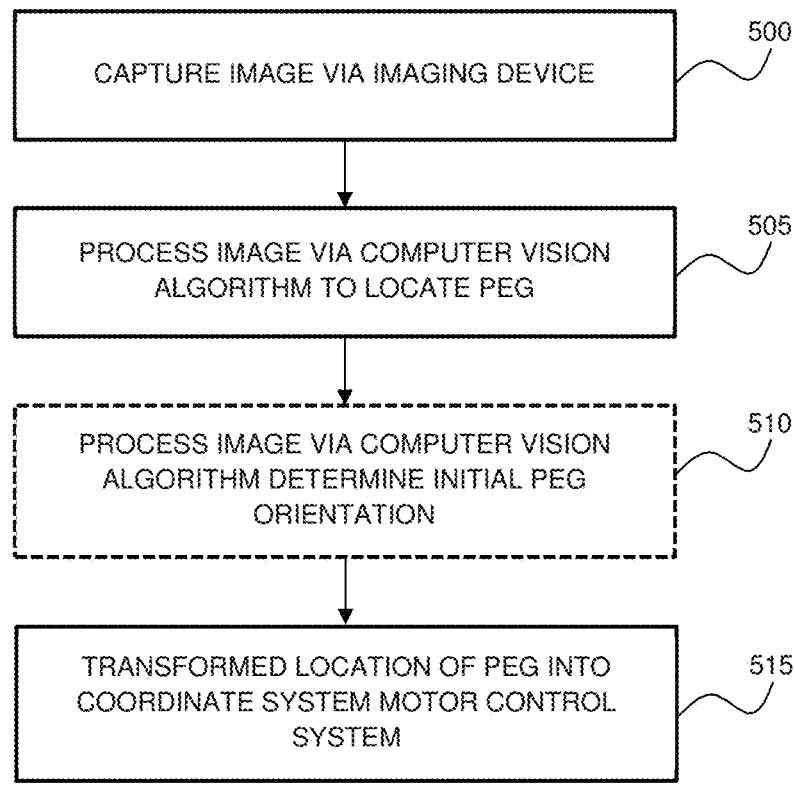
FIG. 4 is a flow chart illustrating an example method for processing the location of the tuning pegs of a stringed instrument with computer vision.

Referring now to FIG. 4, an example method of processing images for peg localization is illustrated. In step 500, an imaging device records one or more images. The imaging device may include one or more imaging cameras. For example, the imaging device may include two cameras that positioned for acquiring first and second stereo images for object location and depth detection. In some example implementations, the imaging device may employ structured light detection or LIDAR for determination of the spatial coordinates associated with a detected peg.

In step 505 of FIG. 4, an object localization algorithm is employed to process one or more acquired images and determine a location of one or more pegs. As shown in step 510, the one or more images may optionally be processed to determine an initial angular orientation of one or more pegs. The coordinates of detected peg are then transformed, using a coordinate transformation, into a coordinate system (frame of reference) associated with the robotic peg manipulator, thereby enabling the robotic peg manipulator to be actuated to engage with the peg during autonomous tuning. Although two cameras are preferred, a single camera with a wide field of view could be used to determine the location of the pegs. The depth could be retrieved by comparing the height of the bounding box to a reference image where the peg is at a known depth corresponding to a given bounding box height. The x and y coordinates can be retrieved from the initial image capture, after distortion effects are accounted for.

The implementation of major techniques into deep learning models include but are not limited to building blocks such as image classification, object detection, object tracking, semantic segmentation, and instance segmentation. Convolutional neural networks (CNNs) are commonly employed for image classification. With a given set of images that are all labelled with a single category, algorithms using either of these methods are asked to predict these categories for a novel set of test images and measure the accuracy of the predictions. A typical use case for CNNs is where one would feed the network images and the network would use various kernels to classify the data within the image scan. In more detail, a kernel is a convolution matrix that is the result of a convolution between a small matrix and an image of interest.

Conversely, Harr-cascades use a set of cascade classifiers that are able to detect and localize specific features in an image. Such algorithms are able to achieve this functionality through a weighted average of a pixel grouping to detect key features in the image. Features of interest (ex. curve of a peg or object's attributes) will return a higher weighted average than other areas of the image. Altogether, the areas of the image with the highest weighted average are where the algorithm would return the coordinates as detected. Altogether, Harr features are manually determined to detect attributes such as edges, colours, lines, and reflectivity.

The task to of object detection and localization within images involves the output of bounding boxes for individual objects. This differs from image classification as it classifies and localize many objects in a field of view instead of a single, dominant object. In this case, the use of CNN or Harr-cascades can be applied to multiple locations, which will result in a sharp increase in computing costs. To make the algorithm more efficient, linear regression tools have been implemented in CNN. For example, these improvements have allowed for object detection to be shifted to more optimized detection frameworks.

Object tracking algorithms refers to the real-time tracking of attributes (i.e. color, edge, contour, reflectivity etc.) of specific objects of interest in each field of view. Object tracking techniques use high performance algorithms derived from CNN.

Semantic segmentation divides an image into pixel groupings which can then be labelled and classified. This technique tries to semantically understand the role of each pixel in the image to identify the object. CNN allows for segmentation maps to be generated for images of any size by implementing up-sampling and down-sampling within its own network.

Instance segmentation is a technique that further adds to semantic segmentation by segmenting different instances of classes. For instance, for the image of a cluttered desk, an algorithm will label five pencils with five different colors.

It will be understood that any one or more of a wide variety of localization algorithms may be employed for peg localization. Non-limiting example algorithms include convolutional-neural-network based algorithms adapted for localization and cascade classifier/localization algorithms. In the example case of a cascade classification algorithm, once training has been completed, a weighted kernel is used in the detection algorithm shown to detect objects of interest.

Faster R-CNN, histogram of oriented gradients (HOG), region-based convolutional neural networks, region-based fully convolutional networks, single-shot detector, and spatial pyramid pooling are examples of specific object localization algorithms. One example algorithm combines down sampling layers and convolutional layers to give it an advantage in speed and accuracy over other object detection algorithms.

As noted above, in some example implementations, one or more images may be processed to determine an initial angular orientation of a detected peg. Peg angle detection can be achieved through various methods. For example, images taken of the pegs can be processed using an edge detection algorithm and the prominent lines output would correlate to the angle of the peg after trigonometric manipulation. In addition to edge detection of the long sides of the peg, edge detection may also be performed on the short sides of the peg to also provide an angle by determining the Y coordinate of where this peg sits in the camera's image. Another example method that may be used is ultrasonic mapping, where sensors would be used to determine the difference between the distances of the top of and the top of the pegs from the sensors, and where the differences in distance are employed to determine the peg angles.

Figure 5:
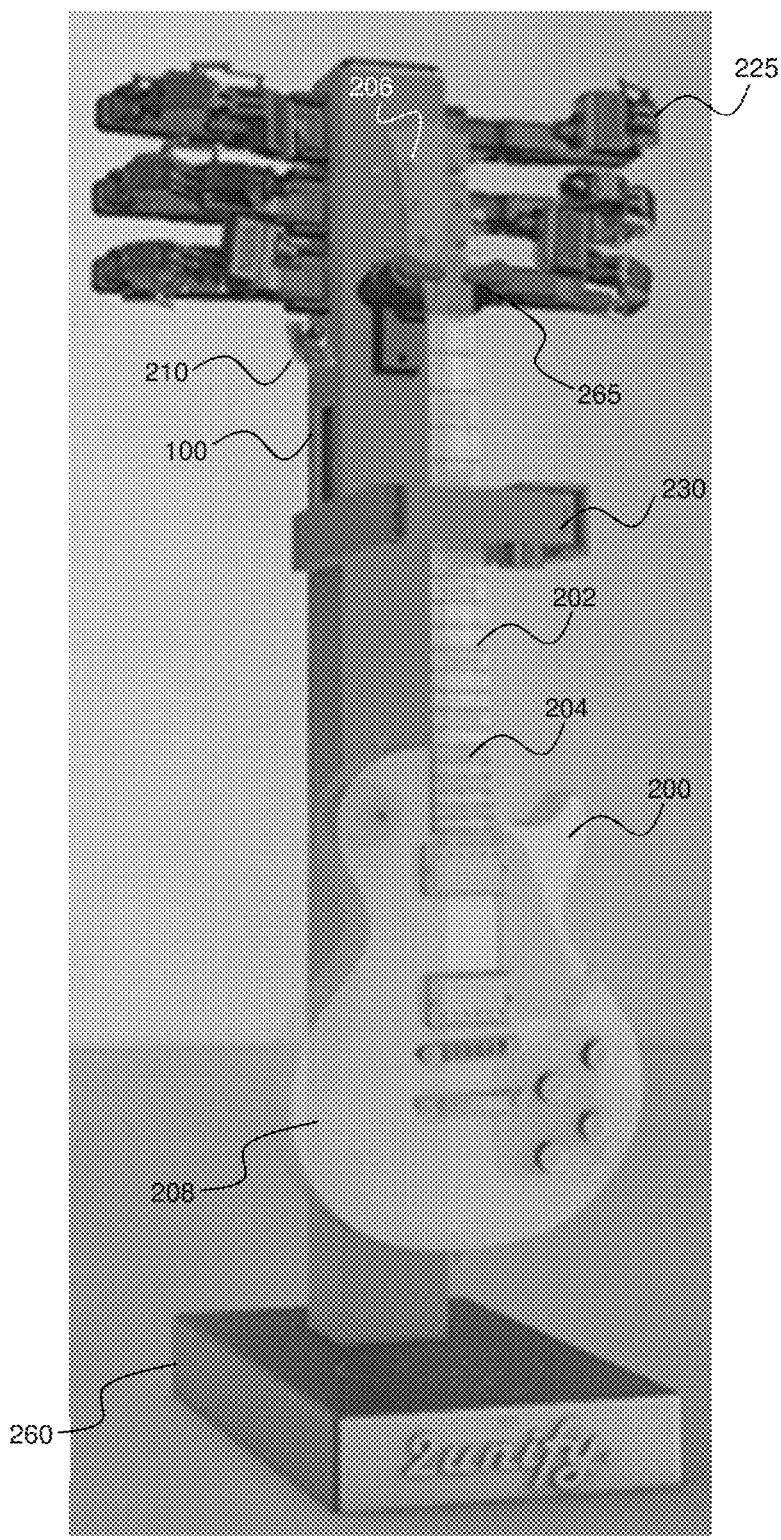
FIG. 5 shows an example embodiment of an autonomous tuner for stringed instruments (front view).
Figure 6:
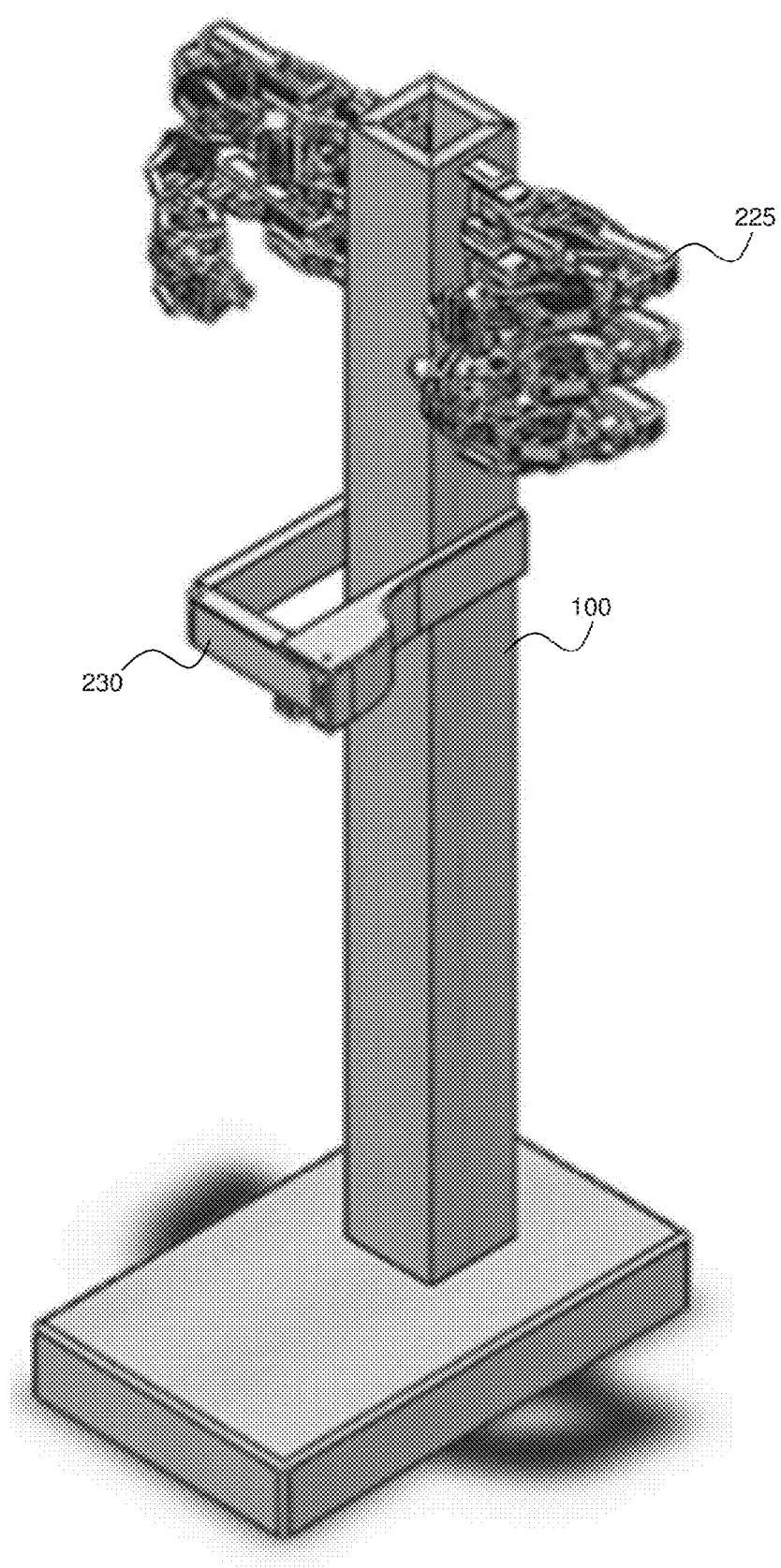
FIG. 6 shows an example embodiment of an autonomous tuner for stringed instruments (isometric view).

FIGS. 5 and 6 show an example of an autonomous tuner for stringed instruments. In the present example, the stringed instrument 200, having strings 202, neck 204, pegs 206 and body 208, is supported by a support frame 260 that functions as a stand. The support frame 260 includes a clamp 265 (not shown in FIG. 6) that can be engaged to mechanically support the stringed instrument during tuning. A set of per-string robotic peg manipulators 225 are supported by the support frame. Each robotic peg manipulator is capable of robotic actuation, relative to the support frame 260, to position a distal region of the robotic peg manipulator adjacent to, or in contact with, a respective peg, to facilitate rotation of the peg when the distal region is rotationally actuated. The example system includes a strumming actuator 230 that is supported by the support frame 260 and can be controlled to agitates one or more strings, thereby generating a standing wave for each actuated string. A camera 210 is provided on each side of the stand to capture the image of the instrument headstock for image processing. In some example implementations, at least one component of the control and processing circuitry 100 may be housed within the support frame 260 (e.g. in one or both of the neck or base of the stand). In some example implementations, one or more components of the control and processing circuitry may be separate from the support frame 260.

Referring again to FIG. 1, an example implementation of control and processing circuitry 100 is shown, which includes one or more processors 110 (for example, a CPU/microprocessor), bus 105, memory 115, which may include random access memory (RAM) and/or read only memory (ROM), a data acquisition interface 120, a display 125, external storage 130, one more communications interfaces 135, a power supply 140, and one or more input/output devices and/or interfaces 145 (e.g. a speaker, a user input device, such as a keyboard, a keypad, a mouse, a position tracked stylus, a position tracked probe, a foot switch, and/or an acoustic transducer for capturing speech commands).

It is to be understood that the example system shown in FIG. 1 is illustrative of a non-limiting example embodiment, and is not intended to be limited to the components shown. Furthermore, one or more components of control and processing circuitry 100 may be provided as an external component that is interfaced to a processing device.

Although only one of each component is illustrated in FIG. 1, any number of each component can be included in the control and processing circuitry 100. For example, a computer typically contains a number of different data storage media. Furthermore, although bus 105 is depicted as a single connection between all of the components, it will be appreciated that the bus 105 may represent one or more circuits, devices or communication channels which link two or more of the components. For example, in personal computers, bus 105 often includes or is a motherboard. Control and processing circuitry 100 may include many more or less components than those shown.

Control and processing circuitry 100 may be implemented as one or more physical devices that are coupled to processor 110 through one of more communications channels or interfaces. For example, control and processing circuitry 100 can be implemented using application specific integrated circuits (ASICs). Alternatively, control and processing circuitry 100 can be implemented as a combination of circuitry and software, where the software is loaded into the processor from the memory or over a network connection.

Some aspects of the present disclosure can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine readable media, such as discrete circuitry components as large-scale integrated circuits (LSI's), application-specific integrated circuits (ASIC's), or firmware such as electrically erasable programmable read-only memory (EEPROM's) and field-programmable gate arrays (FPGAs).

A computer readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like. As used herein, the phrases "computer readable material" and "computer readable storage medium" refer to all computer-readable media, except for a transitory propagating signal per se.

Embodiments of the present disclosure can be implemented via processor 110 and/or memory 115. For example, the functionalities described below can be partially implemented via circuitry logic in processor 110 and partially using the instructions stored in memory 115. Some embodiments are implemented using processor 110 without additional instructions stored in memory 115. Some embodiments are implemented using the instructions stored in memory 115 for execution by one or more microprocessors, which may be general purpose processors or specialty purpose processors. Thus, the disclosure is not limited to a specific configuration of circuitry and/or software.

The control and processing circuitry 100 is programmed with subroutines, applications or modules 150, which include executable instructions, which when executed by the one or more processors 110, causes the system to perform one or more methods described in the present disclosure. Such instructions may be stored, for example, in memory 115 and/or other internal storage. In particular, in the example embodiment shown, the image processing (computer vision) module 155 includes executable instructions for identifying and locating one or more pegs of a stringed musical instrument, according to the methods disclosed herein. The robotic actuation module 160 may include executable instructions for controlling the motor driver 220 to position the peg manipulator in a suitable location for peg actuation, to control the peg manipulator to actuate the pegs for tuning, and to optionally control the strumming actuator 230. The tuning analysis module 165 may include executable instructions for processing acoustic signals recorded by the acoustic transducer 250 and employing the acoustic signals as feedback to tune the peg via the peg manipulator 225.

The present example embodiments that facilitate autonomous tuning of stringed instruments may be beneficial in offering musicians high accuracy, quick tuning, hands-free tuning, a futuristic experience, and may reduce the stresses involved in performing and selling guitars. The systems and methods described herein address the pain points of performance anxiety, poor sales performance, long tuning time, and low accuracy. Since the present systems is automated, the musician can rely on the autonomous stand as a trustful sidekick. The system uses artificial intelligence and robotics to tune any stringed instrument on its own. Consequently, users can rely on technology to achieve high accuracy tuning in a record-breaking speed. Moreover, guitar sales teams may be able to ensure that their products are fully in tune when customers require a sound test. Ultimately, consumers are able to perform and learn new songs in a relaxed state of mind. Additionally, the futuristic style of the product adds an excitement factor to new beginners. Moreover, sales teams are able to enjoy their jobs in a greater way, have higher commission, and communicate to customers without the fear of technical failure.

EXAMPLES

The following examples are presented to enable those skilled in the art to understand and to practice embodiments of the present disclosure. They should not be considered as a limitation on the scope of the disclosure, but merely as being illustrative and representative thereof.

Example Robotic Peg Actuation Subsystem

Figure 7:
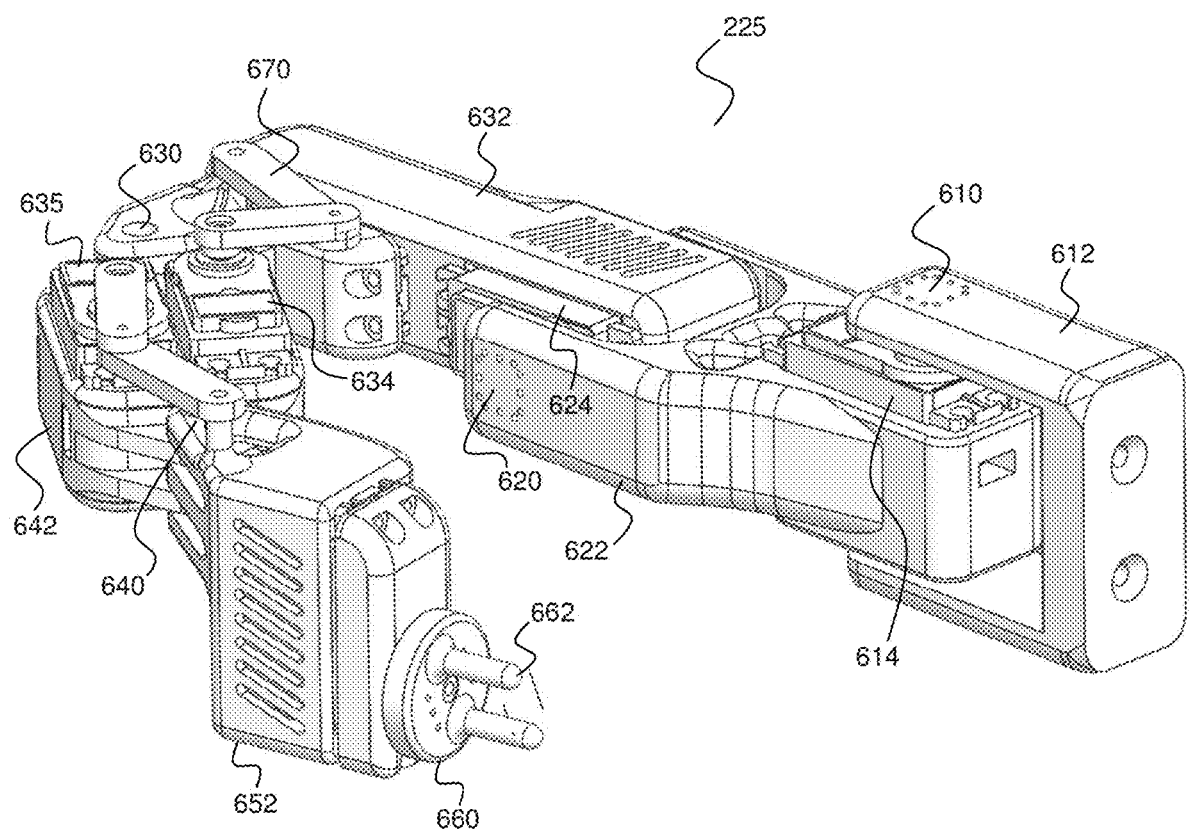
FIG. 7 shows an example embodiment of a peg manipulator for an autonomous tuner (isometric view).
Figure 8:
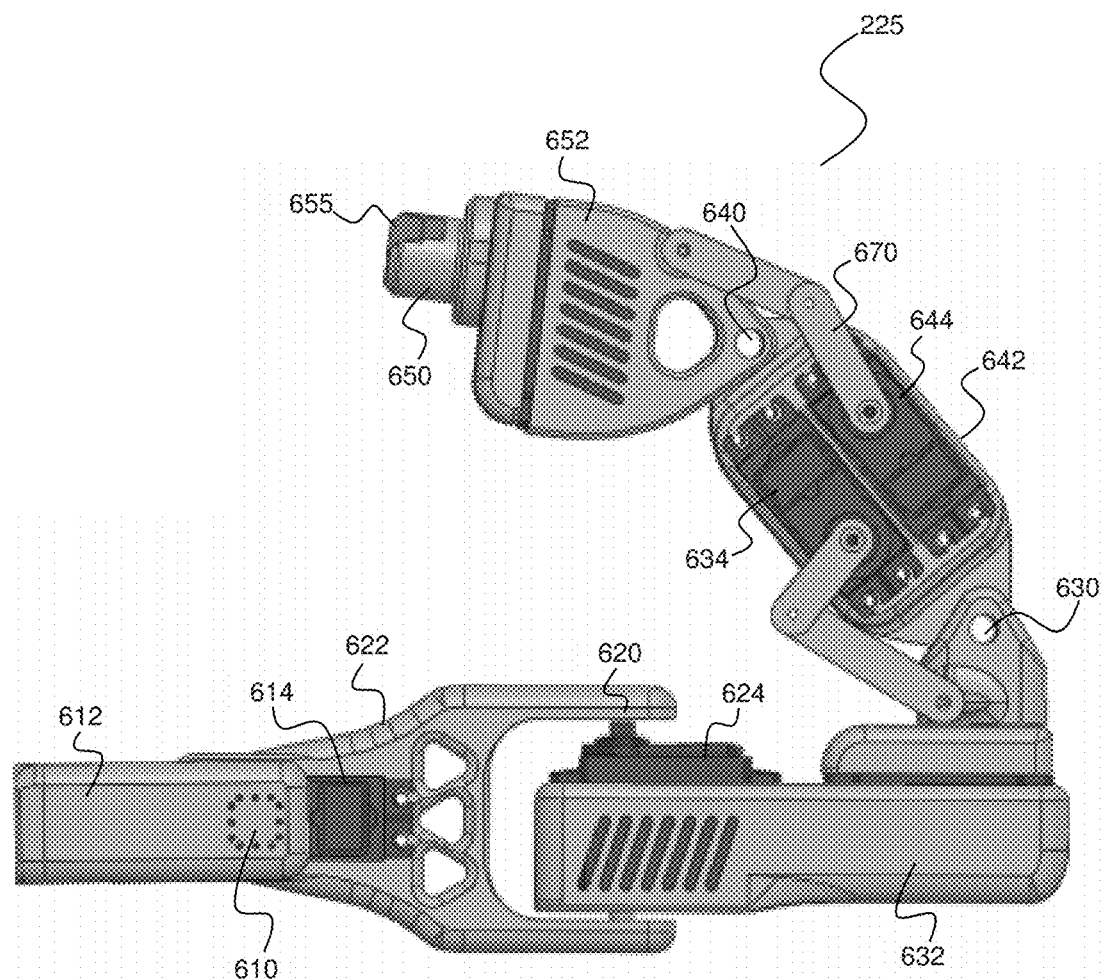
FIG. 8 shows an example embodiment of a peg manipulator for an autonomous tuner (side view).

FIGS. 7 and 8 illustrate an example robotic peg actuation subsystem. In FIG. 7 and FIG. 8, the motor-controlled peg manipulator is made up of the shoulder 612, shoulder servo connection 610, shoulder servo 614, upper arm 622, upper arm servo connection 620, upper arm servo 624, elbow 632, elbow linkage 670, elbow computer 630, left forearm servo 634, right forearm servo 635, forearm 642, forearm linkage 640, wrist 652, peg rotator connector 660, outer peg rotator 650, inner peg rotator 655, and peg rotators 662. The components of this example robotic peg actuator provide additional degrees of freedom to the peg manipulator and additional support to its structure.

Computer Vision Module: Example Implementation of Object Detection

The premise of any computer vision system is to expose it to many training images and allow the system to learn the features that make-up the image of interest. In an example scenario, approximately 1,500 images of guitar pegs were taken. The pegs were manually labelled with bounding boxes to be used as a training set. Knowing that the sample size of the training set was relatively small, it was decided that a narrower split between training and test sets would be used. Typically, 20% of the images were split up as the test set. However, 10% was selected because it would allow for approximately 1,350 images to train on.

The last key decision was based on the number of images required in each training batch, which would affect the overall training time. The minimum number of iterations for training a single class (just guitar pegs) is 4000.

For training purposes, there was a need to include as many images as possible, so the model could learn from multiple images. However, the maximum image per sub batch that could be processed based on the GPU was 4 images per sub batch. A batch size of 64 with 16 subdivisions was used.

The device used a weight function provided by the convolutional neural network to locate the position of the instrument pegs. Within this neural network, the device was able to utilize kernels that were trained using a combination of edge and contour detection to identify pegs in new images. The full-sized implementation used 106 convolutional layers to detect the pegs.

Computer Vision Module: Example Implementation of Pre-Processing

This section outlines an example of a stereoscopic vision system. In order to implement such a vision system, the first step was to remove the distortion from the images in order to ensure the results are accurate. This is typically done through distortion coefficients.

There are two main types of distortion that need to be accounted for: radial distortion and tangential distortion. Radial distortion is intrinsic to the system and is due to the geometry of the lens used. Tangential distortion is external to the system and arises when the camera's imaging plane is not parallel to the object that we are trying to image.

In the radial case, the following equations can be used:

$$x_{corrected} = x(1 + k_1 r^2 + k_2 r^4 + k_3 r^6)$$

$$y_{corrected} = y(1 + k_1 r^2 + k_2 r^4 + k_3 r^6)$$

In the tangential case, the following equations can be used:

$$x_{corrected} = x + [2p_1 xy + p_2(r^2 + 2x^2)]$$

$$y_{corrected} = y + [p_1(r^2 + 2y^2) + 2p_2 xy]$$

Using a few sample images taken with the lens of interest and filter interface the coefficients could be easily calculated. The interface offered distortion filters and modified the image files. It also hosts a series of computer vision libraries which work in conjunction with the system's commands. The output of the function is in the following form:

$$\text{Distortion}_{coefficients} = (k_1 k_2 p_1 p_2 k_3)$$

The output is as follows:

$$\text{Distortion}_{coefficients} = [-0.4296776, 0.2273764, 0.00050349, 0.00052656, -0.10484591]$$

These coefficients were used when pre-processing all subsequent images from these cameras using the lens correction filters and depth map filters. This function outputted two maps: one for the original image and one for the new undistorted image. These maps were then fed into a system that analyzed the matrices and looked at the deformation of lines. It then identified what the checkboard was supposed to be, detected the deformation, and calculated the deformation in the matrix. Finally, it obtained the inverse and multiplied the inverse by the image to unwrap it. It is important to note that the image processing used noise reduction, contrast modulation, and color distortion as a filtration step before sending the image through the detection algorithm. In summary, the function transformed the original image to the undistorted version.

Example of Harr Cascade Detection Process

An example of this algorithm would include the detection of a peg (shiny). If one had a 5×5 Harr feature and wanted to detect a circle, there would be a grouping of pixels present (ex. lighter pixels creates higher values and darker pixels creates lower values). A peg shape would generate a grid-shape (like the letter "D") similar to 1,2,3,2,1. When a sweep is conducted, the multiplier for the middle group of pixels (ex. 255 light) would be a 2× multiplier. Since it is known that the outside would need to be darker (lower than 255), there would be a −2× multiplier. Since it is close to zero, the amount that the weighted average decreases would be very little. Altogether, the weighted average would be highest in areas of the image that contain the peg shape that is of interest.

The next step would involve a sweep (left to right and top to bottom) to check if the threshold is passed. The highest weighed average value would be where the algorithm identified the peg. The coordinates would then be determined from the 5×5 matrix and the center of the image would be selected as the object's location. This location would then be converted to a unit in the metric system (ex. millimeters). This conversion process is outlined below in "Example of Coordinate System Conversion".

Example of CNN Training for Peg Localization

As an example of training a custom CV algorithm, a rough outline will be provided to show how a practitioner may use to recognize and map the boundary (using bounding boxes) around a target area of interest. For instance, this algorithm may be trained to identify an instrument peg in 3D space. This algorithm will be continually fed with pictures of instrument head stocks with the target peg shape to build a portfolio of data points and subsequently improve its versatility and robustness. As a preliminary assessment in the role of assisting a robotic tuning device, the steps below of one of the methods available to train a custom detection algorithm:

1. Start from an initial training image set of 1000+ images of instrument captures with containing the target peg.
2. Install a tool script used for labelling object bounding boxes in images. This can be done in most object-oriented programming languages but for simplicity, a rudimentary script would be created. Take the initial dataset of images and use the script to label each image with a bounding box around the target area (abnormality).
3. Due to the nature of this problem, where the target peg may come in various shapes and sizes for different instruments, the framework will be implemented using an image detection technique of weighted averages to offer higher efficiency in training. A neural network framework is used to train this detection algorithm.
4. The user must upload the dataset and ensure that their computer has enough computational power and a graphic processing unit.
5. The user begins the new training set.
6. The user extracts the neural network real-time object detection folder and begins training the dataset.
7. Finally, save the weight files used for detection in the user's storage drive.

Example of Transformation of Peg Coordinates to Peg Manipulator Coordinate System The present example illustrates an example method for implementing step 415 of FIG. 3, in which coordinates representing the location of the peg in a frame of reference of the computer vision system are transformed into a coordinate system associated with the motor-controlled manipulators through a series of mathematical operations (e.g. projections).

In the present non-limiting example implementation, the peg manipulator employed to actuate the peg is controlled through inverse kinematics (IK) that relate the joints of the arm from the end position and works backwards to outline the path required to achieve the desired position. Since the coordinate system and axis of the camera is different, mathematical projections convert the axes generated by the camera to coordinates that the manipulators can move toward. Altogether, it connects the object axis of the cameras to the coordinate system of the arms to allow for proper movement.

Figure 9:
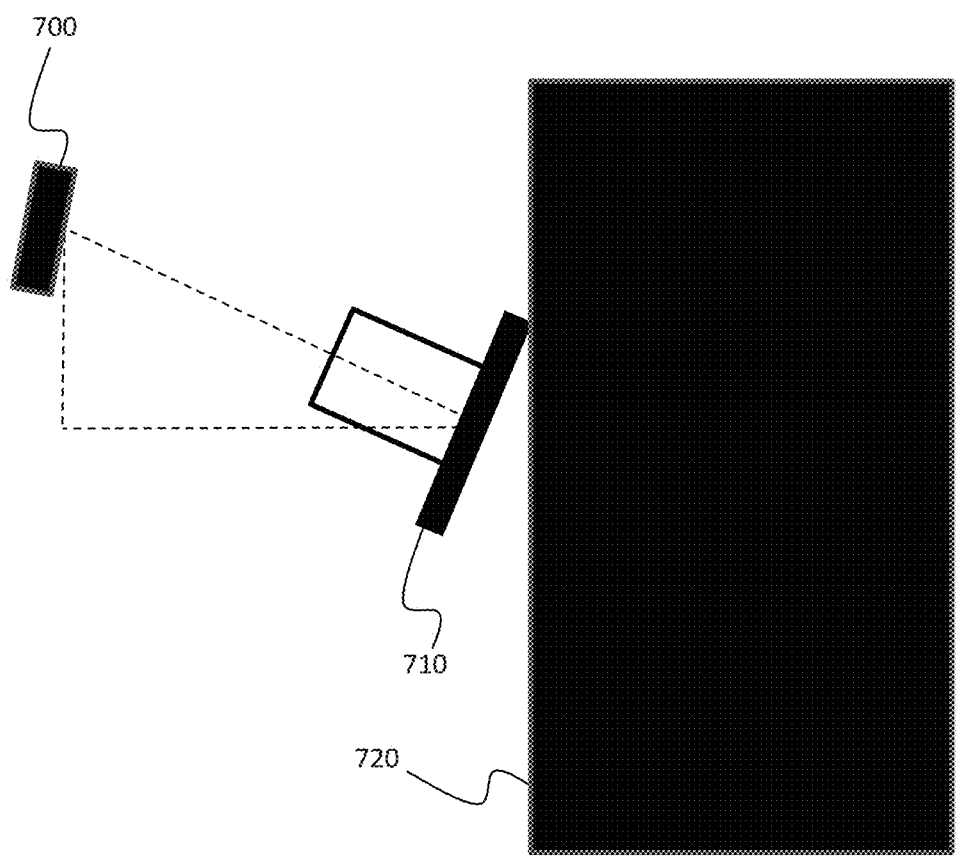
FIG. 9 illustrates the coordinate transformation between the frame of reference of the imaging device and the frame of reference of the robotic peg manipulator.

In the present example coordinate system conversion method, both the cameras and motors have respective associated Cartesian coordinate systems. This is illustrated in FIG. 9. Since the cameras 710 are angled on their mount relative to the stand, the depth recorded by the system would be distorted. Consequently, the known angle of the tilt would be applied as an angle in a trigonometric ratio that would generate the correct horizontal distance from the neck of the stand 720. Since the object of interest and angle of the camera tilt are known, a triangle can be created. The next step would involve solving for the unknown length of the side. The angle of the camera tilt would create a conversion factor that would convert the Cartesian coordinates of the camera to a value that is recognized by the motors. After conversion, the motors are able to move to the correct location that was initially identified by the cameras.

Altogether, the main elements that are employed for coordinate conversion include the camera's field of view, the pixel width of the image, and the distance from the object of interest to the stand. There are key assumptions required to convert the pixel values to millimeters in a simple manner. The first assumption is that the depth from the stand is known. For example, the object of interest's (e.g. instrument peg) distance from the stand is known through ultrasonics, IR sensors, or stereoscopic vision. The second assumption is that the field of view of the camera is known. The pixels can be converted to millimeters based off the distance away from the camera. If the field of view is viewed as a triangle, the plane of view is wider as the object of interest moves further away from the stand. For instance, if the image capture is 1280 pixels wide and the distance is 2 meters (based off field of view), half of the angle (ex. half of 80 degrees) can be added to a trigonometric ratio to determine the width of the plane of view. With a field of view of 80 degrees, one can take the tangent of 40 degrees, multiplied by the distance away from peg 700. Consequently, one can calculate the width of the field of view in millimeters. If the image has two planes of view (ex. camera angle creates two planes of different sizes), the conversion can still be calculated.

Altogether, if the field of view and distance are known, one can take the tangent of half of the field of view, multiplied by distance. This provides the width of half of the plane of view. The total plane of view can then be calculated by doubling the value outputted from this tangent ratio. For example, if the pixel width of the image is 1280 pixels (20 mm wide), then one can divide 1280 by 20 millimeters to get the pixel to millimeter conversion. The computer vision sees that the peg is at 20 pixels in the x-plane. The system would then take the value of 20 and multiply it by the calculated ratio to output the millimeter equivalent. In summary, the sequential steps of coordinate conversion include a projection conversion, a plane of view conversion, and a final conversion to millimeters for the motor-controlled system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A system for autonomous tuning of a stringed instrument, the system comprising:
   a support frame configured to mechanically engage with the stringed instrument such that the stringed instrument is supported relative to said support frame;
   an imaging subsystem supported relative to said support frame;
   a robotic peg manipulator movable relative to said support frame;
   an acoustic transducer; and
   control and processing circuitry operably coupled to said imaging subsystem, said robotic peg manipulator and said acoustic transducer, said control and processing circuitry comprising at least one processor and associated memory, said memory comprising instructions executable by said at least one processor for performing operations comprising:
   receiving, from said imaging subsystem, image data characterizing a field of view including a peg of the stringed instrument;
   processing the image data to locate the peg;
   controlling said robotic peg manipulator to position said robotic peg manipulator relative to the peg such that said robotic peg manipulator is capable of rotationally actuating the peg;
   recording acoustic signals responsively generated by agitation of a string associated with the peg; and processing the acoustic signals and employing tuning criteria to control said robotic peg manipulator to rotationally actuate the peg for tuning the stringed instrument.

2. The system according to claim 1 further comprising:
a string agitation mechanism capable of agitating the string of the stringed instrument when the stringed instrument is supported by said support frame;
said control and processing circuitry being operatively coupled to said string agitation mechanism for actuating said string agitation mechanism for generating the acoustic signals.

3. The system according to claim 1 wherein said robotic peg manipulator is controllable by said control and processing circuitry to translate and engage with at least one additional peg identified by said control and processing circuitry.

4. The system according to claim 1 wherein said robotic peg manipulator is controllable by said control and processing circuitry for translating said robotic peg manipulator to engage with the peg.

5. The system according to claim 1 wherein said robotic peg manipulator comprises at least one joint and an associated motor for actuating the joint.

6. The system according to claim 1 wherein said robotic peg manipulator comprises at least three joints, each joint being controllable by actuation of a respective motor.

7. The system according to claim 1 wherein a distal region of said robotic peg manipulator comprises an end effector configured to contact the peg and apply a torque to the peg when the end effector is rotated.

8. The system according to claim 7 wherein said control and processing circuitry is configured to control said robotic peg manipulator to rotate said end effector of said robotic peg manipulator while positioning said robotic peg manipulator to engage with the peg, thereby enabling catching of the peg by structural features of said end effector during approach of said robotic peg manipulator relative to the peg.

9. The system according to claim 1 wherein said robotic peg manipulator is a first robotic peg manipulator, said system further comprising at least one additional robotic peg manipulator controllable by said control and processing circuitry to translate and engage with a respective additional peg identified by said control and processing circuitry.

10. The system according to claim 9 wherein said control and processing circuitry is configured to perform polyphonic tuning by simultaneously controlling said first robotic peg manipulator and said at least one additional robotic peg manipulator to tune the stringed instrument.

11. The system according to claim 1 wherein said robotic peg manipulator is a first robotic peg manipulator positioned to reside on a first side of the stringed instrument when the stringed instrument is supported relative to said support frame for robotically actuating one or more first pegs on located on the first side of the stringed instrument, and wherein said system comprises a second robotic peg manipulator operably coupled to said control and processing circuitry and positioned to reside on a second side of the stringed instrument when the stringed instrument is supported relative to said support frame for robotically actuating one or more second pegs on located on the second side of the stringed instrument.

12. The system according to claim 1 wherein said support frame is a stand configured to support the stringed instrument.

13. The system according to claim 12 wherein a height of said stand is adjustable to facilitate autonomous of different types and/or different sizes of stringed instruments.

14. The system according to claim 1 wherein one or more of said imaging subsystem and said robotic peg manipulator is positionable, relative to said support frame, to facilitate autonomous of different types and/or different sizes of stringed instruments.

15. The system according to claim 1 wherein at least a portion of said control and processing circuitry is housed within said support frame.

16. The system according to claim 1 wherein said support frame is configured to support at least one stringed instrument selected from the group consisting of a guitar, cello, violin, ukulele, banjo, viola, mandolin, and harp.

17. The system according to claim 1 wherein the stringed instrument is a piano, said support frame being configured to mechanically engage with the piano to support said imaging subsystem and said robotic peg manipulator relative to the piano for autonomous tuning of at least one tuning pin of the piano.

18. The system according to claim 1 wherein the stringed instrument is a first stringed instrument, and wherein said support frame is configured to support a second stringed instrument while also supporting the first stringed instrument, wherein the field of view of said imaging subsystem includes a peg of the second stringed instrument, and wherein said robotic peg manipulator is controllable to robotically engage with and rotationally actuate at least one peg from the first stringed instrument and at least one peg from the second stringed instrument.

19. The system according to claim 1 wherein said control and processing circuitry is configured to locate the peg by employing one of an R-CNN algorithm, a histogram of oriented gradients (HOG), a region-based convolutional neural network, a region-based fully convolutional network, a single-shot detector, and spatial pyramid pooling.

20. A method for autonomous tuning of a stringed instrument, the method comprising:
mechanically engaging the stringed instrument with a support frame such that the stringed instrument is supported relative to the support frame;
employing an imaging subsystem supported relative to the support frame to obtain image data characterizing a field of view including a peg of the stringed instrument;
processing the image data to locate the peg;
controlling a robotic peg manipulator to move the robotic peg manipulator relative to the support frame and mechanically engage with the peg such that the robotic peg manipulator is capable of rotationally actuating the peg;
recording acoustic signals responsively generated by agitation of a string associated with the peg; and
processing the acoustic signals and employing tuning criteria to control the robotic peg manipulator to rotationally actuate the peg for tuning the stringed instrument.

* * * * *